United States Patent [19]

Jaw et al.

[11] Patent Number: 5,485,868
[45] Date of Patent: Jan. 23, 1996

[54] FAST ACTING HIGH OUTPUT VALVE

[75] Inventors: Link C. Jaw, Tempe; Frank O. Liu, Chandler, both of Ariz.

[73] Assignee: Scientific Monitoring, Inc., Tempe, Ariz.

[21] Appl. No.: 305,018

[22] Filed: Sep. 13, 1994

[51] Int. Cl.⁶ .............................. F16K 1/24; F16K 31/44
[52] U.S. Cl. ............................................ 137/601; 251/212
[58] Field of Search ............................. 137/601; 251/212

[56] References Cited

U.S. PATENT DOCUMENTS

| | | | |
|---|---|---|---|
| Re. 25,729 | 2/1965 | Kennedy | 137/601 |
| 3,592,240 | 7/1971 | Hedrick | 251/212 X |
| 4,633,900 | 1/1987 | Suzuki | 137/601 X |
| 4,817,508 | 4/1989 | Prochnow | 251/212 X |

*Primary Examiner*—Stephen M. Hepperle
*Attorney, Agent, or Firm*—Christopher Klein

[57] ABSTRACT

A fast-acting high-output valve is provided comprised of a valve body covering an opening, a means for applying a force to the center of said valve, and a means for transforming said force to opposite movement at the periphery of said valve body. As the valve body periphery is moved opposite from the opening covered by the valve body, an annular gap is created through which fluid may flow. When the force to the center of the valve body is eliminated, the valve body periphery drops back into place and the valve closes.

9 Claims, 2 Drawing Sheets

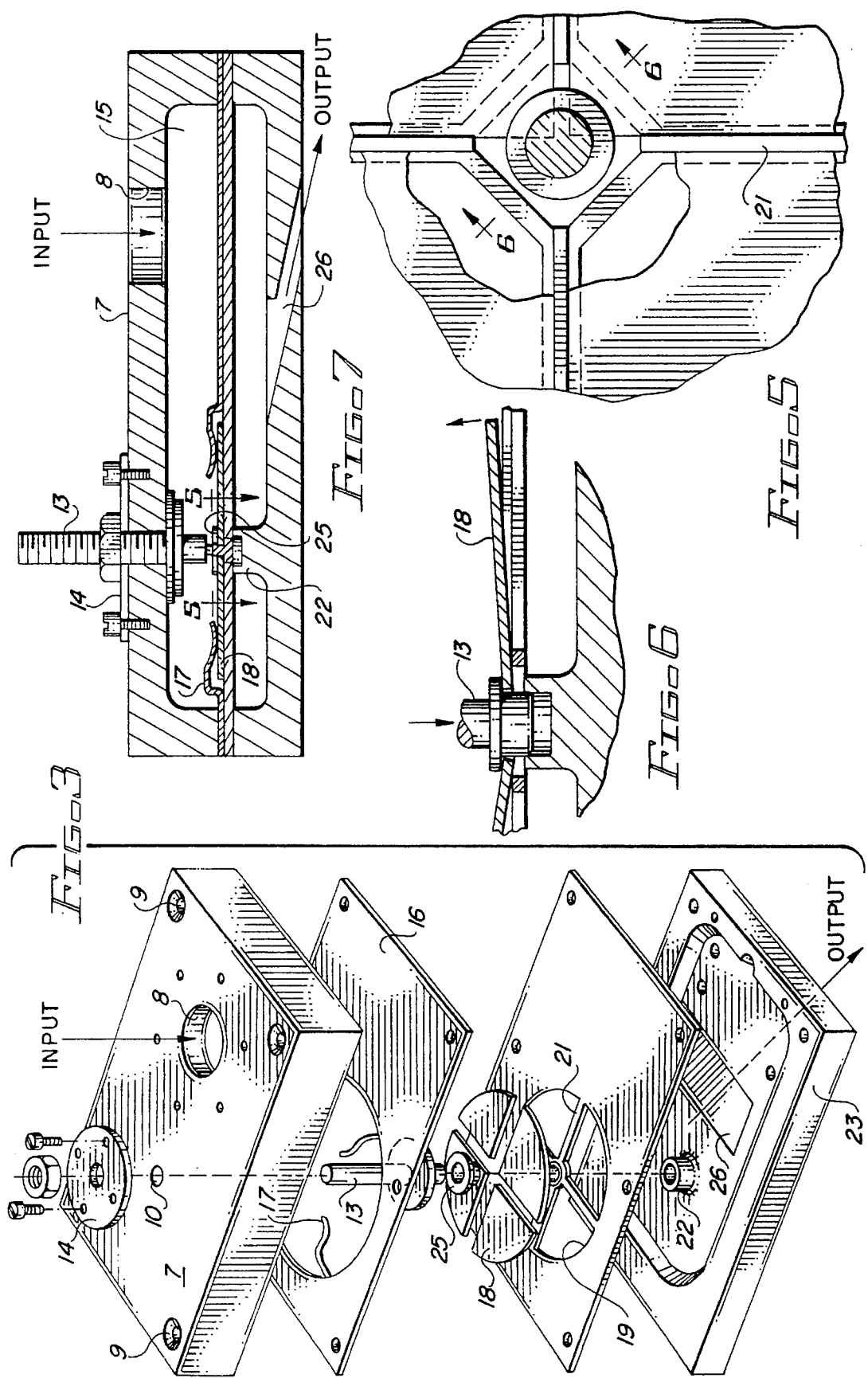

FAST ACTING HIGH OUTPUT VALVE

The present invention was developed while working under United States Army contract DAAJ02-94-C-0017.

FIELD OF THE INVENTION

The present invention relates to a novel apparatus for permitting fluid flow through an opening. A fast-acting high-output valve is provided that is easily operated and permits high volumes of fluid to rapidly pass through a given opening.

BACKGROUND OF THE INVENTION

Valves are used in numerous types of industries for a wide variety of purposes. The word "valve" is commonly used to describe any device that permits fluid flow or regulates fluid flow of whatever fluid is contained in a pipe or tube. Usually, fluid flow control is achieved by the use of a flap, lid or plug that may be closed or clamped to prohibit flow, or opened to permit flow. Additionally, a common type of valve found is a gate valve that opens and closes by rotating pivotally around a hinge. The gate is opened by placing it in a position parallel to the fluid movement and permits fluid flow. When the gate is turned perpendicular to fluid flow, it restricts or prohibits any flow.

The problem with many types of valves is that they are not very fast-acting, in that they require turning or clamping of the valve which takes time. As a result, when one initially starts to open a valve, a small amount of fluid is let through the valve. The amount of fluid passing through then increases as the valve is continued open. The same is true for closing a valve. As one closes a valve, fluid will continue to flow through the valve until the valve is completely shut. There is always some volume of fluid that passes through the valve after one starts to close a valve, referred to as residual pass-through.

There is a need for a valve which is fast acting and which, when opened or closed, will open or close quickly and widely to permit a large volume of fluid to pass through when open and minimize residual pass-through when closed. One industry concerned with developing such a fast-acting high-output valve is the turbine engine industry.

Gas turbine engines require high performance and high reliability in order to assure that flights can be completed effectively, efficiently and safely. This is especially true in military applications. Air is forced through the inlet or mouth of a turbine engine and from there directed into a turboshaft or turbojet axial compressor. As the flow in such an axial compressor is reduced or made non-uniform while the compressor or rotational speed is held constant, a point will be reached at which some or all of the engine blades begin to stall and engine instabilities occur. The most violent of these is "surge", which for high speed compressors (as in a turbine engine) can result in periodically reversed flow and mechanical damage. The other result of air being reduced or made non-uniform is rotating stall. "Stall" can result in a region of blocked flow covering half of the circumference of the engine inlet and rotating at half the rotor speed, and may lock the engine.

When a gas turbine engine experiences a compressor "stall", the given flight will be effected. In cases of severe stall, the engine or drive train components can lock or freeze, causing loss of engine operation. When this happens in flight, the results can be catastrophic. For an in depth discussion of how a turbine engine works, and turbine engine surge and stall, see Emmons, H. W., Pearson, C. E., and Grant, H. P.; "Compressor Surge and Stall Propagation," *Transactions of the ASME,* May, 1955, p. 455–469; and Greitzer, E. M.; "The Stability of Pumping Systems—the 1980 Freeman Scholar Lecture,— *ASME J. of Fluids Engineering,* June, 1981, vol. 103, p. 193–242.

Surge and stall have three causes: (1) engine deterioration; (2) aerodynamic distortions (especially at the air inlet); and (3) hot gas injection (from weapon firing). Despite the knowledge of these causes, there has been little success in providing turbine engines with any reliable way of preventing engine surge or stall. Research has indicated, however, that the inception of a flow disruption in compressor rotors (referred to above as rotating "stall") can be delayed by locally affecting the air flow conditions of the critical compressor stage rotor.

The air flow conditions can be locally modified by bleeding air from behind the affected rotor, or injecting air in front of the affected rotor. This results in improved performance for the compression system. Successful control of rotating stall allows improved performance of turbomachinery which reduces operating, replacement and repair costs. An injection valve to inject air in front of an affected rotor or a bleed valve to extract air behind a rotor, however, must be able to cycle from full close to full open to full close at a very fast speed (approximately 150 Hz), and must be sized to pass a maximum of approximately 1.65 cubic feet of air per second at standard day conditions.

Accordingly, it is an object of the present invention to provide a fast-acting high-output valve capable of opening and closing at a high rate of speed, and which permits a large volume of fluid to pass through said valve.

It is a further object of the invention to provide a fast-acting high-output valve capable of injecting air in front of a compressor or bleeding off air behind a compressor in a turbine engine to reduce rotating stall.

All references referred to above are incorporated herein by reference.

SUMMARY OF THE INVENTION

In accordance with these and other objects of the present invention, a fast-acting high-output valve apparatus is provided using a circular geometry and mechanical amplification. The valve of the present invention is shaped like a circle (or pie), and is comprised of a plurality of single components each shaped like an individual piece of pie, or a mixtilinear triangle (i.e., a triangle with two straight sides and one curved side). As pressure is placed at the center of the circle, the periphery of the circular valve moves upwards creating a gap which permits fluid to flow from one side of the valve to another.

This valve provides a simple and efficient way to permit fluid flow from one side of a valve to another. Additionally, the valve of the present invention is fast-acting and permits high-output of fluid, which makes it suitable for injecting air in front of a turbine engine compressor to eliminate rotating stall.

BRIEF DESCRIPTION OF THE FIGURES

FIG. 3 is an exploded view of an air flow regulating device utilizing a valve of the present invention, illustrating assembly of one embodiment.

FIG. 5 is an enlarged view of the center of a valve of the present invention.

FIG. 6 is a close up view of a valve of the present invention, showing an action of said valve pieces.

FIG. 7 is a cut-away side view of an air flow device utilizing a valve of the present invention.

DETAILED DESCRIPTION OF THE INVENTION

Figure 1:
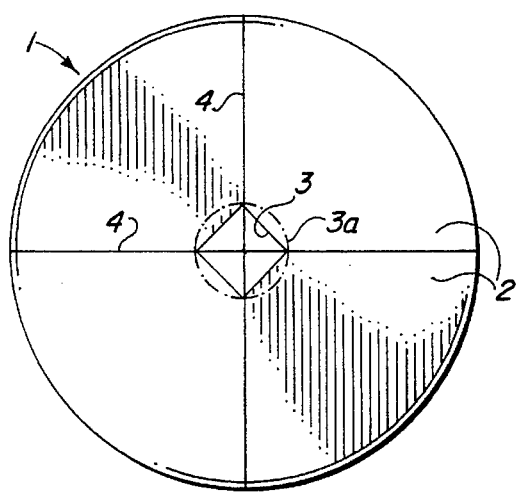
FIG. 1 is a bottom view of a valve of the present invention.

The present invention relates to a fast-acting high-output valve. FIG. 1 shows a bottom view of one embodiment of a valve of the present invention. Valve body 1 is circular (or pie shaped) in geometry, and is comprised of a plurality of individual pieces 2. Although valve body 1 is circular in the figures, it may be of any other suitable shape (e.g., hexagon, octagon, or other polygon). Each of the individual pieces 2 is a mixtilinear triangle, having two straight sides of equal length and a curved side. From the figure, it is seen that each individual piece 2 is shaped like an individual piece of pie, formed together to make a circle or pie shaped valve. Each individual piece 2 of valve body 1 is separated from the adjoining pieces by motion guards 4. If valve body 1 is a polygon (e.g., an octagon) then each individual piece 2 would be shaped like a triangle, assembled together to form the polygonal shape.

Located on the underside of valve body 1 is a hinge 3, which may be a circle (shown as dashed line 3a) or an equilateral polygon with a number of sides equal to the number of individual pieces 2 comprising valve body 1. In FIG. 1, valve body 1 is shown comprised of four individual pieces 2, and hinge 3, therefore, is a polygon comprised of four sides (i.e., a square). Hinge 3 contains one side which abuts against individual pieces 2 of valve body 1. The other side of hinge 3 rests against, or may be constructed as part of, a housing or support to resist movement as force is applied to the top of valve body 1.

When valve body 1 is not open, it is resting on a static structure (not shown in FIG. 1) containing an opening approximately the size and circumference of valve body 1 (called the "valve seat"). As valve body 1 rests upon this structure, it seals the opening preventing any movement of fluid through the valve.

Figure 2:
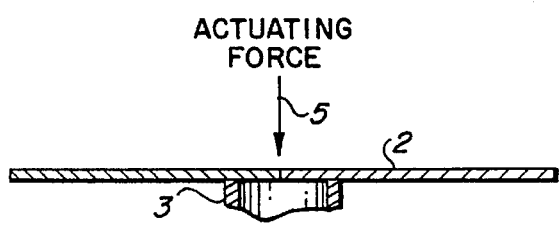
FIG. 2 is a side view of a valve of the present invention.

Referring now to FIG. 1 and FIG. 2, when valve body 1 is pushed downward at its center by actuating device 5, the periphery (or rim) of valve body 1 moves upward (or opposite to the applied force) due to hinge 3 underneath circular valve body 1. Hinge 3 transforms the downward displacement at the center of valve body 1 to an opposite motion at the edges of individual pieces 2. The amplification ratio (i.e., the distance the rim of valve body 1 moves upwards compared to the distance of the actuating force on the top center of valve body 1) depends on the relative distances of the valve radius bisected by the hinge. For example, the closer hinge 3 is to the center of valve body 1, the greater the amplification ratio will be (i.e., the greater the rim of valve body 1 will rise for an actuating force on the top center of valve body 1).

As the periphery of the valve moves upward, it creates an annular gap between valve body 1 and a static structure on which valve body 1 is resting when it is not pushed downward by actuator 5 (often called the "valve seat"). This annular gap permits a fluid medium (e.g., gas or liquid) to flow from one side of valve body 1 to the other. As individual pieces 2 move upwards to create the annular gap, motion guards 4 prevent the pieces 2 from slipping and/or sliding over one another.

The annular gap created as the rim of valve body 1 moves upwards permits a large volume of fluid to flow past valve body 1 at a very high rate of speed. In a practical application of a valve of the present invention, a flow source is connected to the top side of valve body 1 (the "top side" being the side of valve body 1 opposite the side abutting hinge 3). When a force is provided by actuating device 5, flow passes through the annular gap into the bottom side achieving flow control. The higher pressure on the top of valve body 1 can serve as a restoring force for the valve (i.e., serve to force individual pieces 2 into the closed position after actuating device 5 stops applying force).

Figure 4:
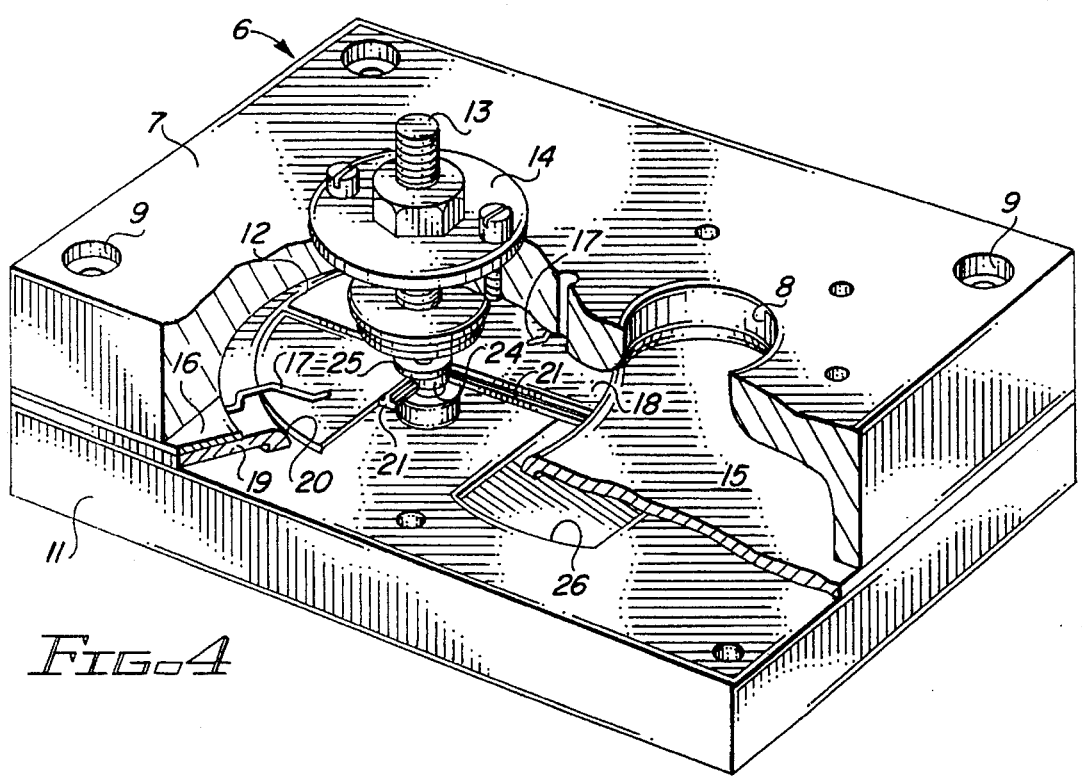
FIG. 4 is a cut-away view of an air flow regulating device utilizing a valve of the present invention, showing one embodiment of a valve after assembly.

As mentioned above, these characteristics make the valve of the present invention ideally suitable for injection of air in front of a turbine engine compressor. An example of one embodiment of a valve of the present invention suitable for use on a turbine engine is shown in FIG. 3 and FIG. 4. A high pressure air flow device 6 is shown, comprised of a top housing 7, said top housing 7 comprised of a solid material containing a plurality of holes therethrough. Certain holes 9 in top housing 7 are provided for securing said top housing 7 to a bottom plate 11 via a means for securing (e.g., nut, screw, weld). Top housing 7 is also provided with an airflow inlet 8 which permits air to be injected into device 6. Finally, top housing 7 is provided with actuator opening 10 which is located above the center of valve body 12 and which is capable of receiving and guiding actuating rod 13. Actuating rod 13 may be held in place by actuating plate 14 and secured to top housing 7 via a means for securing (e.g., screws, nuts, welds).

In one embodiment of device 6, the outer portion of top housing 7 (i.e., the exterior portion away from valve body 12) is flat. The interior portion is concave to create a cavity 15 in which high pressure air is introduced. Beneath top housing 7 is placed a restoring spring plate 16, said plate 16 comprised of a flat plate containing a hole therein greater in size than valve body 12. Extending inwardly from the periphery of the hole in plate 16 are a plurality of restoring springs 17. Ideally, the number of restoring springs 17 is equal to the number of individual pieces 18 of valve body 12. Restoring springs 17 are used to place a force on the individual pieces 18 of valve body 12, to force the pieces 18 into their original closed position as valve body 12 closes.

Below restoring spring plate 16 is support plate 19, said support plate 19 containing a hole therein to act as the valve seat 20. Extending inwardly from the periphery of valve seat 20 are motion guards 21. Motion guards 21 are comprised of elongated members capable of guiding individual pieces 18 of valve body 12, and capable of preventing individual pieces 18 of valve body 12 from overlapping each other during movement. One possible configuration of said motion guards 21 is shown in FIG. 4. Motion guards 21 extend inwardly from the periphery of valve seat 20, but stop short of extending to the center. Motion guards 21 end at the point where bottom hinge 22 extends upwards from bottom plate 23, and are connected to each other by ring 24 for support.

Bottom plate 23 is also provided at the base of device 6, said plate 23 containing one side from which extends support hinge 22. Support hinge 22 as shown is a circle, but may be a polygon containing a number of sides equal to the number of individual pieces making up the valve. In the example shown, therefor, one may use a square support hinge. If a polygonal support hinge is used (FIG. 5), the points of the polygon are aligned with the motion guards 21 extending towards the center of the valve seat. The individual pieces 18 of valve body 12 are supplied into valve seat 20, each piece 18 fit into a space created by motion guards 21. The wide ends of pieces 18 rest against valve seat 20, the sides of pieces 18 rest against motion guards 21, and the tips of pieces 20 are joined individually to central force distributing plate 25. Central force distributing plate 25 assures that the force from actuating rod 13 is distributed equally to all individual pieces 18 of valve body 12, and assures an air tight fit where all individual pieces 18 meet at the center of valve body 12. All individual pieces 18 rest on support hinge 22 towards the center of the valve.

Additionally provided in bottom plate 11 is outlet 26 through which fluid will flow after passing by valve body 12. Outlet 26 may then be continuously attached to a turbine engine at a point in front of a compressor turbine to direct air into the turbine preventing engine stall.

Referring then to FIG. 3 and FIG. 4, high pressure air is provided through inlet 8 and is prevented from passing through outlet 26 when valve body 12 is closed. Valve body 12 is kept closed by the force of the high pressure air and restoring springs 17. To open valve body 12, a force is applied to actuating rod 13, said force is transferred to force distributing plate 25 and pushes down at the center of valve body 12. Bottom support hinge 22 resists the downward force being applied at the center of valve body 12, and transforms the downward displacement at the center of valve body 12 to an opposite (upward) motion at the periphery (or rim) of valve body 12 (see FIG. 6). As the individual pieces 18 of valve body 12 move upwards at the periphery, they are guided by motion guards 21, and prohibited from sliding or overlapping. An annular gap is created between the rim of valve body 12 and valve seat 20 through which the high pressure air flows. The high pressure air then flows through the annular gap, past valve body 12, and out of outlet 26. When enough air has passed, the force on actuating rod 13 is released and the high pressure air, as well as restoring springs 17, push the individual pieces 18 back into place and close valve body 12.

The invention has been described in detail with particular reference to a preferred embodiment thereof, but it will be understood that the invention is capable of other and different embodiments. As is readily apparent to those skilled in the art, variations and modifications can be affected within the spirit and scope of the invention. Accordingly, the foregoing disclosure, description, and figures are for illustrative purposes only, and do not in any way limit the invention, which is defined only by the claims.

We claim:

1. A fast-acting high-output valve suitable to control flow of a fluid through an opening, said valve comprised of a valve body in a geometric shape similar to that of said opening, said valve body containing a center and a periphery, and said valve body comprised of a plurality of individual pieces;

a means for applying a force to the center of said valve body;

a means for transforming said force at the center of said valve body to an opposite motion at the periphery of said valve body; and a means for guiding said individual pieces as said force at the center of said valve body is transformed to an opposite motion at the periphery of said valve body, said means capable of preventing said individual pieces from shifting laterally over one another.

2. A fast-acting high-output valve suitable to control flow of a fluid through an opening, said valve comprised of a circular valve body, said valve body containing a center and a periphery, and said valve body comprised of a plurality of individual pieces assembled to form a circle;

a means for applying a force to the center of said valve body;

a means for transforming said force at the center of said valve body to an opposite motion at the periphery of said valve body; and a means for guiding said individual pieces as said force at the center of said valve body is transformed to an opposite motion at the periphery of said valve body, said means capable of preventing said individual pieces from shifting laterally over one another.

3. A fast-acting high-output valve suitable to control flow of a fluid through an opening, said valve comprised of a polygonal valve body, said valve body containing a center and a periphery, and said valve body comprised of a plurality of individual pieces assembled to form a polygonl;

a means for applying a force to the center of said valve body;

a means for transforming said force at the center of said valve body to an Opposite motion at the periphery of said valve body; and a means for guiding said individual pieces as said force at the center of said valve body is transformed to an opposite motion at the periphery of said valve body, said means capable of preventing said individual pieces from shifting laterally over one another.

4. The valve of claim 1 wherein said fluid is a gas.
5. The valve of claim 1 wherein said fluid is a liquid.
6. The valve of claim 2 wherein said fluid is a gas.
7. The valve of claim 2 wherein said fluid is a liquid.
8. The valve of claim 3 wherein said fluid is a gas.
9. The valve of claim 3 wherein said fluid is a liquid.

* * * * *

UNITED STATES PATENT AND TRADEMARK OFFICE
CERTIFICATE OF CORRECTION

PATENT NO. : 5,485,868
DATED : Jan. 23, 1996
INVENTOR(S) : Link C. Jaw and Frank Q. Liu It is certified that error appears in the above-indentified patent and that said Letters Patent is hereby corrected as shown below:

In the Title Page, item 75 should read
"Inventors: Link C. Jaw, Tempe; Frank Q. Liu, Chandler, both of Ariz."

Signed and Sealed this

Twentieth Day of January, 1998

Attest:

BRUCE LEHMAN

*Attesting Officer*  *Commissioner of Patents and Trademarks*